United States Patent [19]
Campbell

[11] 4,104,933
[45] Aug. 8, 1978

[54] PLANET GEAR POSITIONING AND RETAINING MECHANISM

[75] Inventor: John J. Campbell, Decatur, Ill.

[73] Assignee: Caterpillar Tractor Co., Peoria, Ill.

[21] Appl. No.: 743,383

[22] Filed: Nov. 19, 1976

[51] Int. Cl.² .......................... F16H 1/28; F16H 3/44; F01M 9/00
[52] U.S. Cl. .................................. 74/801; 74/750 R; 74/785; 184/6.12
[58] Field of Search ...................... 74/801, 750 R, 785, 74/788, 781 R, 467; 184/6.12; 192/4 A

[56] References Cited
U.S. PATENT DOCUMENTS

| | | | |
|---|---|---|---|
| 2,408,336 | 1/1943 | Orr | 184/6 |
| 3,583,526 | 6/1971 | Mulleder | 74/467 |

Primary Examiner—Benjamin W. Wyche
Assistant Examiner—R. C. Turner
Attorney, Agent, or Firm—Phillips, Moore, Weissenberger, Lempio & Strabala

[57] ABSTRACT

Planet gears of a planetary gearing system for a vehicle drive wheel are mounted on a carrier for orbital motion around a motor-driven sun gear and transmit drive at reduced speed to a ring gear which turns the wheel hub. Each planet gear is fastened to the carrier through a bearing and axle pin having ends which extend through support bores in the carrier. Lubricant is maintained around the carrier and each axle pin has a lubricant passage with an outlet directed toward the bearing and with an inlet facing in the direction of orbital motion of the axle pin to cause such motion to force lubricant into the passage. Longitudinal movement of all axle pins and also angular motion of all axle pins relative to the supporting carrier is prevented by a single unitary retainer element secured to a surface of the carrier and having edge portions which extend into a linear slot in the sidewall of each axle pin.

10 Claims, 3 Drawing Figures

U.S. Patent  Aug. 8, 1978  4,104,933
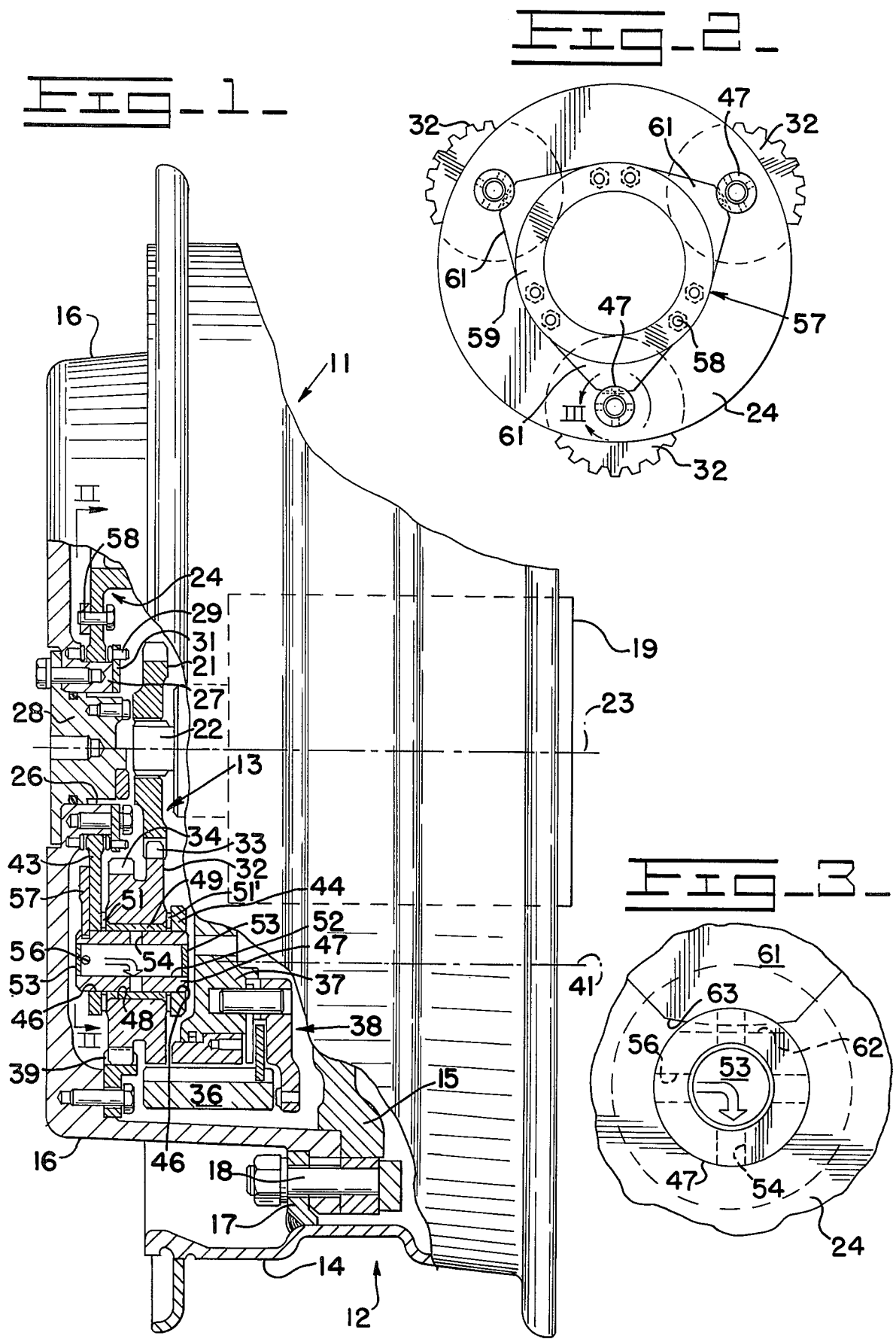

4,104,933

PLANET GEAR POSITIONING AND RETAINING MECHANISM

BACKGROUND OF THE INVENTION

This invention relates to planetary gearing systems and more particularly to structures for attaching rotatable orbiting planet gears to the planet gear carrier of such systems.

Planetary gearing systems are used in a variety of mechanisms in which rotary drive is to be transmitted while realizing a speed reduction or speed increase accompanied by a torque increase or reduction. The drive connections between a motor and a wheel of a vehicle is one example of mechanism in which planetary gearing systems are often used. While planetary gearing systems may take a variety of specific forms, all have in common a planet gear carrier supported for rotation about a primary axis and carrying one or more planet gears which may orbit about the primary axis while also being rotatable about a secondary orbiting axis which is parallel to the primary axis. Depending on the type of planetary gearing system, the planet gears may engage one or both of a sun gear and a ring gear which are both disposed coaxially with respect to the primary axis.

To attach the planet gears to the carrier some form of axle pin is mounted on the carrier and extends through an axial bore of the associated planet gear to journal the planet gear in position. In some cases the axle pins have been rotationally fixed relative to the carrier so that the planet gear turns on the pin while in other cases the axle turns with the planet gear which rotates relative to the carrier. Depending on which type of arrangement is used, the axle pin may be restrained against longitudinal displacement by a friction fit in either the gear or in the carrier except where complex retainer means have been provided.

Planetary gearing systems usually operate within a housing containing lubricant and heretofore it has been the more common practice to assume that adequate lubrication occurs at the planet gear bearing surfaces simply by reason of the fact that the planet gears sweep through the adjacent volume of lubricant during operation.

The above-described prior constructions complicate the process of assembling and disassembling planetary gearing systems and it may be found that there is not in fact adequate lubrication of planet gear bearing surfaces with the result that wear is accelerated and energy is dissipated in the form of undesirable heating of the mechanism.

SUMMARY OF THE INVENTION

This invention is a compact and economical structure for attaching planet gears to the carrier of a planetary gearing system which structure assures an adequate flow of lubricant to planet gear bearing surfaces and which is very easily assembled and disassembled.

Each planet gear has an axial bore through which an axle pin extends and a bearing may be provided within the bore between the gear and axle pin in a preferred form of the invention. Each end of the axle pin extends axially from the planet gear into bores formed in the carrier to journal the planet gear on the carrier while enabling rotation of the planet gear relative to the axle pin. The axle pin has a lubricant passage with an outlet situated within the planet gear bore to direct lubricant to the bearing surfaces and with an inlet situated outside of the planet gear bore and facing into the direction of orbital movement of the planet gear and axle pin. This causes orbital motion within the planetary gearing system to tend to force a flow of lubricant into the axle pin to the planet gear bearing surfaces.

To restrain each axle pin against longitudinal motion which might release the planet gear and also against angular motion relative to the carrier which might misorient the lubricant passage opening, a retainer element secured to the carrier enters an indentation in the wall of the axle pin. In a preferred form of the invention, employing a plurality of planet gears and axle pins, the indentation in each axle pin is a linear slot cut into the wall of the axle pin and the retainer means is a single unitary element secured to the carrier and having a series of edge portions each of which fits into the slot of a separate one of the plurality of axle pins, the retainer element being fastened to the carrier by easily disengageable means such as threaded bolts or the like.

Accordingly it is an object of this invention to provide for a more adequate lubrication of planet gears in a planetary gearing system and to facilitate the assembly and disassembly of planet gear mounting structure therein.

The invention together with further objects and advantages thereof will best be understood by reference to the following description of a preferred embodiment taken in conjunction with the accompanying drawing.

BRIEF DESCRIPTION OF THE DRAWING

In the accompanying drawing:

FIG. 1 is a view of a wheel hub and rim for a motor grader vehicle with portions cut away to illustrate final drive mechanism contained within the wheel hub including a planetary gearing system, FIG. 2 is a section taken along line II—II of FIG. 1 further illustrating the planet gear carrier of the system and structure for mounting the planet gears thereon, and FIG. 3 is an enlarged view of the portion of FIG. 2 encircled by dashed line III thereof.

DESCRIPTION OF A PREFERRED EMBODIMENT

Referring initially to FIG. 1 of the drawing, the invention was designed for usage in a hydrostatically driven final drive mechanism 11 situated with a wheel 12 of a motor grader vehicle and will therefore be described in that context, it being apparent that the invention may also be adapted to other rotary drive transmitting apparatus of various kinds which also employ a planetary gearing system 13.

In this example, an annular wheel rim 14 is adapted to receive a tire and encircles an annular housing 16 to which it is attached through lugs 17 and bolts 18. Lugs 17 also connect the wheel rim and housing to a rotatable hub 15 journaled on the axle structure of the associated vehicle. Disposed within rim 14 and housing 16 in alignment with the rotary axis of the wheel is a wheel-drive hydraulic motor 19 which may also be secured to axle structure of the vehicle of which the wheel is a component in a manner known to the art.

To provide a speed reduction and torque amplification, the planetary gearing system 13 includes a sun gear 21 spline-coupled to the output shaft 22 of the hydraulic motor 19 so that it may be rotated by the motor. The motor output shaft 22 and sun gear 21 are disposed for rotation about a primary rotary axis 23 which is the rotational axis of the wheel rim 12 and housing 16 as well.

Referring now to FIG. 2 in combination with FIG. 1, the planetary gearing system 13 further includes an annular planet gear carrier 24 situated within housing 16 and also disposed for rotation about the primary axis 23. Housing 16 has a central opening 26 bounded by a sleeve portion 27 of the housing which extends inwardly towards the sun gear 21 in coaxial relationship with the sun gear. Opening 26 of the housing is normally closed by a circular center member 28. The annular carrier 24 is coaxial with the sleeve portion 27 of the housing for rotation therearound and is restrained against axial movement by a plurality of thrust pins or buttons 29 a portion of which are embedded in the adjacent wall of housing 16 and another portion of which are retained in an annular plate 31 which is itself secured coaxially to the inner end of housing sleeve portion 27, the buttons 29 being spaced apart at angular intervals around each side of the carrier 24. This particular construction for retaining and positioning the carrier 24 of a planetary gearing system, utilizing the buttons 29, is the subject matter of my copending application Ser. No. 743,384, now U.S. Pat. No. 4,092,878 entitled FLOATING CARRIER RETENTION FOR A PLANETARY GEARSET, filed concurrently with this application.

Through positioning and retaining structure to be hereinafter described in more detail, planet gears 32 are journaled on carrier 24, three such planet gears being provided in this example with the three planet gears being equiangularly spaced around the primary rotational axis 23. The planet gears 32 in this particular planetary gearing system are of the compound form having a first large-diameter set of teeth 33 and a second smaller-diameter set of teeth 34. The first teeth 33 engage sun gear 21 and also engage a reaction member or first ring gear 36 disposed in coaxial relationship to first rotary axis 23 and which encircles each of the three planet gears 32. To establish a drive condition in which drive is transmitted from motor 19 to wheel rim 12, first ring gear 36 is held rotationally fixed by being locked to a rotationally stationary member 37 of the vehicle axle structure by actuation of a fluid pressure-operated clutch 38. Clutch 38 may be selectively disengaged to permit rotation of the first ring gear 36 which has the effect of decoupling the wheel rim 12 from the drive motor 19 to establish a free-wheeling mode of operation.

To transfer drive to the housing 16 and wheel rim 12 when clutch 38 is engaged, a second ring gear 39 is secured within the housing and encircles each of the planet gears 32 to engage the smaller-diameter sets of teeth 34 of the planet gears. When motor 19 turns sun gear 21, the engagement of the planet gears 32 with the rotationally fixed first ring gear 26 constrains the planet gears to rotate about their own axes 41 and also to orbit about the sun gear. This orbiting motion of the planet gear causes the carrier 24 to rotate about axis 23 at a rate similar to that of the orbiting speed of the planet gears which speed is substantially less than the angular velocity of the sun gear 21. Second ring gear 39, which engages the smaller-diameter teeth 34 of each of the planet gears, is thereby caused to revolve about axis 23 at a still smaller angular rate. This rotation of the second ring gear 39 turns the housing 16 and rim 12. Thus the wheel is driven through the planetary gearing system 13 by motor 19 but with a substantial speed reduction and corresponding torque amplification. The motor 19 is preferably of the reversable form to provide for both forward and reverse travel of the associated vehicle.

Considering now the structure for coupling the planet gears 32 to carrier 24 in such a manner that friction and consequent heating and power wastage is reduced while assembly and disassembly is facilitated, reference should be made to FIGS. 1 and 2 in combination. Carrier 24 has a flat annular plate portion 43 disposed as previously described and adjacent each planet gear 32 a bracket arm 44 extends from the plate portion around to the other side of the planet gear. Aligned axle pin-receiving bores 46 in plate portion 43 and bracket arm 44 define the secondary rotational axis 41 of the planet gear 32. An axle pin 47 extends through an axial bore 48 of the planet gear 32 and through the carrier bores 46 to journal the planet gear on the carrier. Preferably, annular friction-reducing bearing means 49 are disposed within bore 48 of the gear between the gear and axle pin, although if it is not desired to utilize bearings, planet gear bore 48 may be of lesser diameter to define a bearing surface which rides directly against the outer surface of the axle pin 47. A washer 51 may be disposed coaxially on the axle pin between the planet gear 32 and plate portion 43 of the carrier and a similar washer 51' may be disposed between the planet gear and bracket arm 44 of the carrier.

A volume of lubricating oil is contained within the housing 16 and to provide for forceable direction of lubricant to the bearing surfaces between axle pin 47 and planet gear 32, the axle pin has a longitudinal passage 52 closed at each end by a plug disc 53. One or more radially directed outlets 54 extend from passage 52 to bearing 49 in the central region of the axle pin. The end of the axle pin 47 which passes through the carrier plate portion 43 extends for a small distance beyond plate 43 at the opposite side of the plate from planet gear 32. As best seen in FIG. 3 in combination with FIG. 1, one or more radially directed inlets 56 communicate the oil-containing region between carrier plate 43 and housing 16 with the longitudinal passage 52 of the axle pin. The axle pins 47 are angularly oriented in carrier 24 to locate the lubricant inlet passages 56 in a tangential relationship to the path of orbital motion of the axle pin. Thus, an inlet passage 56 at each axle pin is oriented to face into the direction of orbital motion of the axle pin around primary axis 23 to cause the orbital motion of the planet gear and carrier to tend to force a flow of lubricant into the inlet 56. This in turn tends to force a flow of lubricant from outlets 54 to the bearing surfaces between the axle pin and planet gear. Where, as in the present example, the planetary gearing system rotation is reversable, two such passages 56 facing in opposite directions may be provided in the axle pin as best seen in FIG. 3. In such an arrangement, oil which enters one of the passages 56 tends to move towards the outlet 54, rather than leaving the pin through the other inlet passage 56, owing to the effects of centrifugal force.

The above-described axle pin construction provides for a more positive flow of lubricant to bearing surfaces of the planet gears but this is fully effective only if the angular orientation of the axle pins in the carrier remain as described above so that the oil lubricant passage inlets 56 remain at least substantially aligned with the direction of orbital motion. Referring now to FIGS. 2 and 3 in combination, a single unitary retainer element 57, releasably attached to the carrier 24 by means such as bolts 58, serves both to lock the axle pins 47 into the desired angular orientation and also to restrain the axle pins against longitudinal movement.

Retainer element 57 has an annular center portion 59 which is coaxial with the carrier 24 and into which the fastening bolts 58 engage. Three tab portions 61 of the retainer element extend in the radial direction from center portion 59 with each such tab extending towards a separate one of the axle pins 47. As best seen in FIG. 3, a linear slot 62 is cut in the wall of each axle pin with the slot being in tangential relationship to the path of orbital motion of the axle pin. The edge 63 of the associated one of the tab portions 61 of the retainer element is aligned in a similar manner and fits into the slot thereby preventing axial movement of the axle pin relative to the carrier and also preventing any substantial angular turning of the axle pin relative to the carrier.

To enable the retainer element to be simultaneously fitted into the slots 62 of each of the three axle pins by being placed against the carrier and then rotated slightly, the retainer element tab edges 63 should not extend all the way to the base of the slot 62. The assembly and disassembly process may be further facilitated if the edges 63 have a slight degree of arcuate curvature rather than being strictly linear. This does not prevent the retainer element from locking the axle pin against any longitudinal movement although it does permit a small amount of angular movement of the axle pins. This small amount of possible angular movement is acceptable as it does not result in the lubricant inlet passages 56 becoming misoriented to an extent that would significantly interfere with the forcing of a lubricant flow into the axle pin as previously described.

While the invention has been described with reference to an example employing three planet gears 32, the invention may also be utilized in planetary gearing systems which have different numbers of planet gears. Similarly, for purposes of example, the invention has been described with reference to a planetary gearing system 13 of the particular form having a sun gear, compound planet gears and two ring gears. Other planetary gearing systems may variously lack a sun gear, one or both ring gears or employ simpler planet gears, various arrangements of these kinds being known to those skilled in the art. Such planetary gearing systems by definition all do employ one or more planet gears supported on a revolvable carrier and the above-described planet gear positioning and retaining mechanism may also be utilized in these other forms of gearing systems.

Thus, while the invention has been described with reference to a single exemplary embodiment, many variations and modifications are possible and it is not intended to limit the invention except as defined in the following claims.

What is claimed is:

1. Planet gear positioning and retaining means for a planetary gearing system comprising:
    a planet gear carrier disposed for rotation about a primary axis and having an axle pin-receiving bore defining a secondary rotary axis which is parallel to said primary axis and spaced therefrom and which orbits around said primary axis as said carrier revolves therearound,
    at least one planet gear supported on said carrier for rotation about said secondary axis and for orbiting movement around said primary axis, said planet gear having an axial bore therethrough aligned along said secondary axis,
    housing means for retaining lubricant in the region of orbital movement of said planet gear,
    an axle pin extending through said axle pin-receiving bore of said carrier and through said axial bore of said planet gear along said secondary axis for journaling said planet gear to said carrier, said axle pin having a lubricant passage with at least one radially directed outlet within said axial bore of said planet gear, said lubricant passage having at least one lubricant intake opening situated outside said axial bore of said planet gear and being directed away from the axis of said axle pin and towards the path of orbital motion of said axle pin around said primary axis, whereby the orbital motion of said axle pin forces a flow of lubricant into said intake opening and
    a retainer element secured to said carrier and having means for limiting angular motion of said axle pin relative to said axle pin-receiving bore of said carrier to assure that said intake opening remains directed into said path of orbital motion.

2. The combination defined in claim 1 wherein said retainer element also has means for preventing axial movement of said axle pin relative to said axle pin-receiving bore of said carrier.

3. The combination defined in claim 1 wherein said planetary gearing system has a plurality of said planet gears each carried on an individual one of a plurality of said axle pins and wherein each of said axle pins has an indentation in a sidewall thereof and wherein said retainer element has portions which extend into said indentation of each of said axle pins to block angular and axial movement of each of said axle pins relative to said axle pin-receiving bores of said carrier.

4. The combination defined in claim 3 wherein said indentation of each of said axle pins is a linear slot in the sidewall of said axle pin aligned tangentially with respect to said path of orbital motion and wherein each of said portions of said retainer element has an edge extending along said slot of a separate one of said axle pins.

5. The combination defined in claim 4 wherein said edge of each of said portions of said retainer element extends only partially into the one of said slots which is engaged thereby.

6. The combination defined in claim 5 wherein said edge of each of said portions of said retainer element has an arcuate configuration enabling all of said edges to be entered into the associated one of said slots simultaneously by rotation of said retainer element relative to said carrier.

7. The combination defined in claim 1 wherein said axle pin has an additional lubricant intake opening also directed away from the axis of said axle pin but facing in the opposite direction from said first intake opening to generate a flow of lubricant into said lubricant passage when said carrier orbits in an opposite direction.

8. The combination defined in claim 1 wherein an annular bearing is disposed in said axial bore of said planet gear between said planet gear and said axle pin.

9. The combination defined in claim 1 wherein a plurality of said planet gears are supported on said carrier by a plurality of said axle pins and wherein each of said plurality of axle pins is restrained against axial movement relative to said carrier and against angular movement relative to said carrier by a single one of said retainer elements.

10. Planet gear positioning and retaining means for a planetary gearing system comprising:
- a planet gear carrier disposed for rotation about a primary axis and having an axle pin-receiving bore defining a secondary rotary axis which is parallel to said primary axis and spaced therefrom and which orbits around said primary axis as said carrier revolves therearound.
- at least one planet gear supported on said carrier for rotation about said secondary axis and for orbiting movement around said primary axis, said planet gear having an axial bore therethrough aligned along said secondary axis,
- an axle pin extending through said axle pin-receiving bore of said carrier and through said axial bore of said planet gear along said secondary axis for journaling said planet gear to said carrier, said axle pin having a lubricant passage with at least one radially directed outlet within said axial bore of said planet gear and having at least one radially directed lubricant intake opening situated outside said axial bore of said planet gear and facing into the path of orbital motion of said axle pin around said primary axis,
- a retainer element secured to said carrier and having means for limiting angular motion of said axle pin relative to said axle pin-receiving bore of said carrier,
- wherein three of said planet gears are supported on said carrier by three of said axle pins, said three axle pins being angularly spaced apart on said carrier by equal angular intervals with reference to said primary axis and being equidistant from said primary axis, and wherein each of said plurality of axle pins is restrained against axial movement relative to said carrier and against angular movement relative to said carrier by a single one of said retainer elements, and wherein said retainer element has an annular central portion releasably secured to said carrier in coaxial relationship to said primary axis and has three equiangularly spaced tab portions each extending from said central portion into a slot formed in the sidewall of a separate one of said axle pins.

* * * * *